United States Patent Office 2,746,374
Patented May 22, 1956

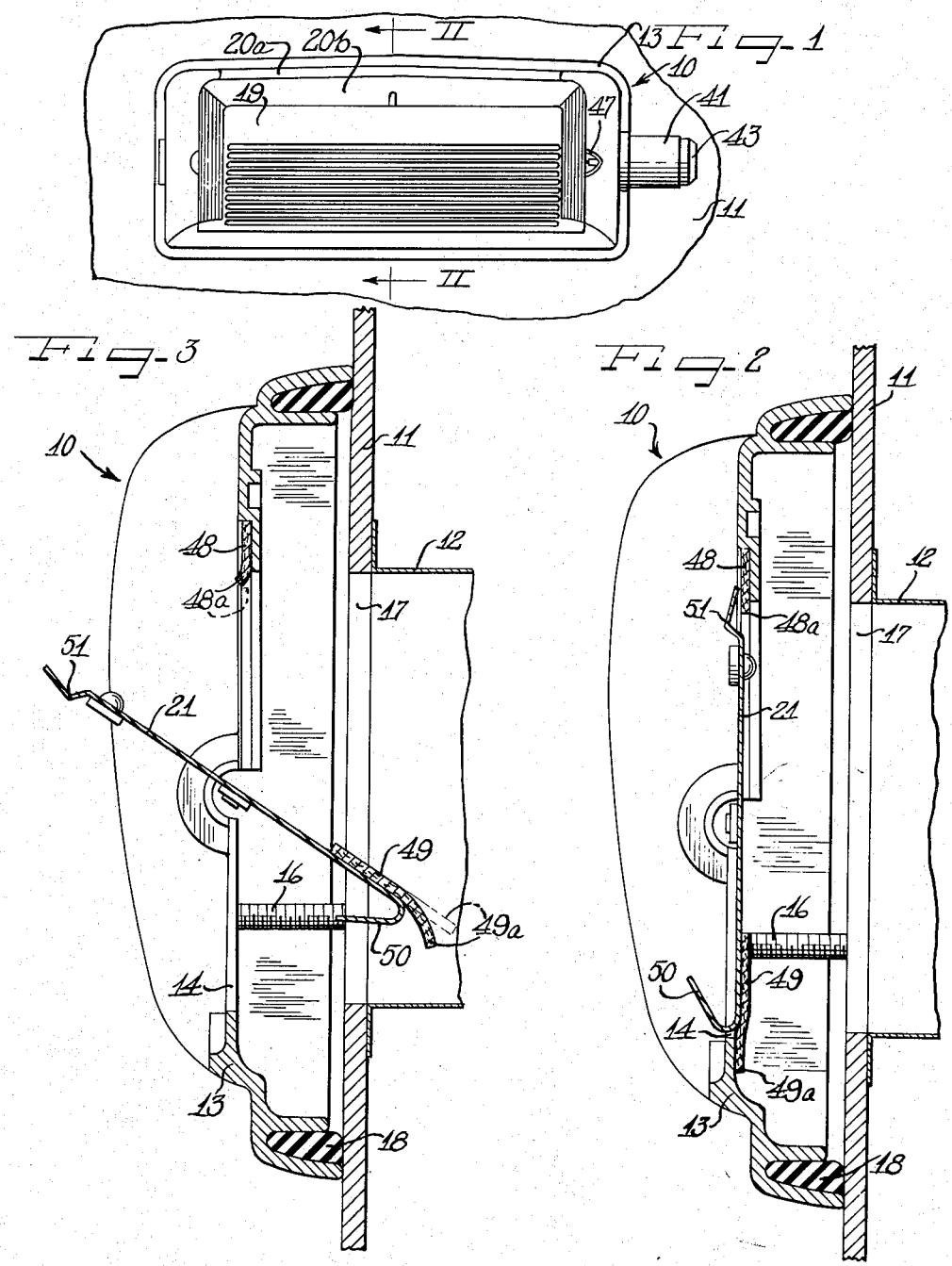

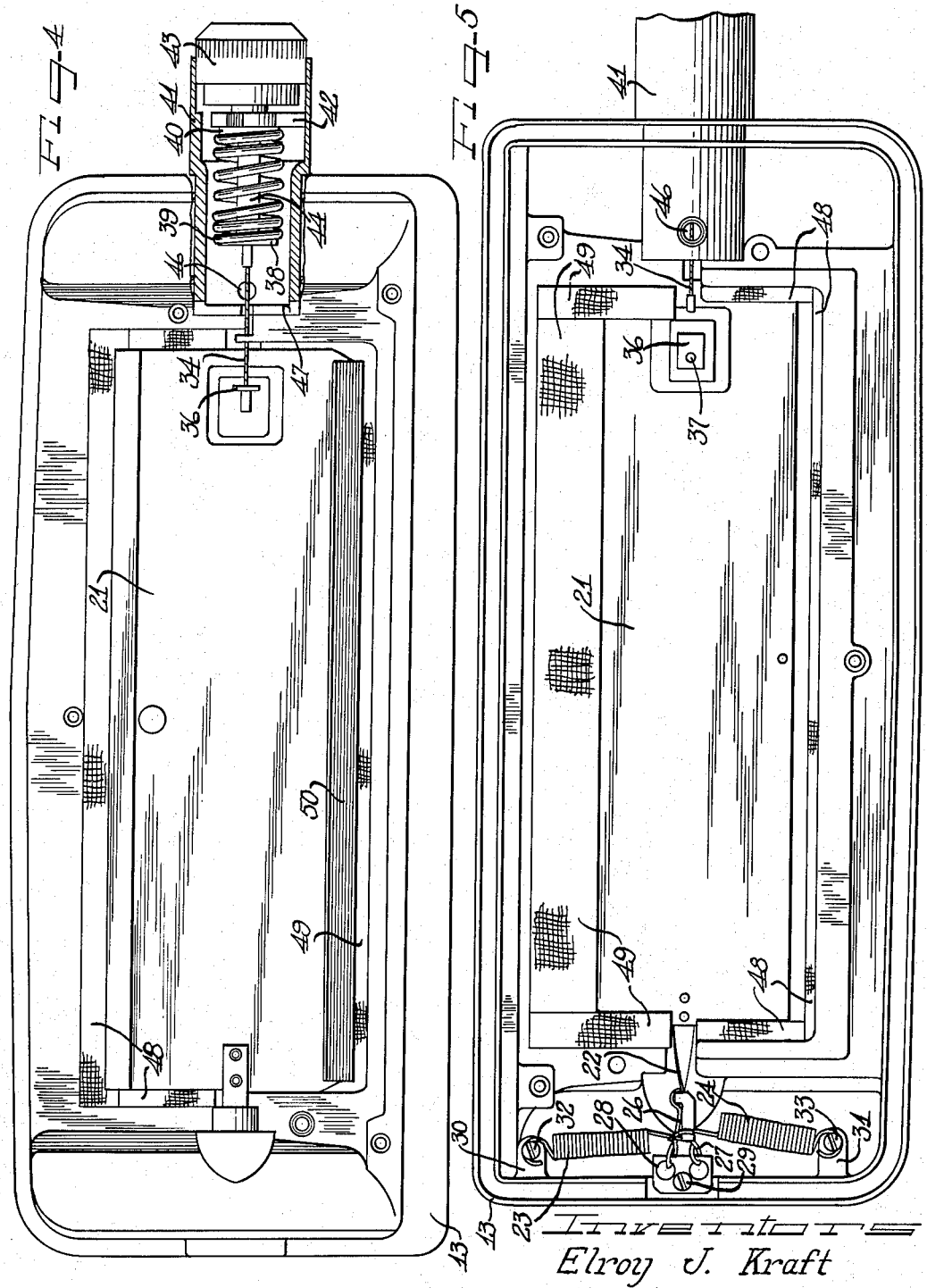

2,746,374

FLUTTERLESS DAMPER FOR A HEAT REGISTER STRUCTURE

ElRoy J. Kraft, Des Plaines, Ill., and Lee S. Wasserman, Dayton, Ohio, assignors to The Dole Valve Company, Chicago, Ill., a corporation of Illinois Application October 31, 1951, Serial No. 254,082

5 Claims. (Cl. 98—108)

The subject matter of the present invention relates generally to ventilating apparatus and more particularly to an improved damper structure wherein damper flutter is more effectively controlled.

Recent developments in the art of heating and ventilating have emphasized the provision of pressure flow devices. In controlling the distribution of pressurized ventilating air, duct systems are frequently provided including thermostatically controlled dampers which are adjustably positioned in the ducts in order to control the flow of pressurized ventilating fluid therethrough. For example, a butterfly type vane may be employed as a damper, the vane having upper and lower overhanging marginal edges which engage opposite sides of a wall forming a duct outlet opening.

Sometimes considerable difficulty is encountered in the operation of a duct damper since adjustable positioning of the damper in a duct carrying pressurized ventilating fluid at or near the closed position will result in a flutter action or rapid cycling action between a full closed and a partially opened position. If the damper and the register frame forming the duct outlet opening in which the damper is positioned are made of metal, the flutter action is likely to be very noisy and may actually be so severe as to deterioratively effect the structural operativeness of the damper structure.

Apparently one of the significant factors underlying the problem of flutter damper is the fact that there appears to be a non-linear variation of closure suction operating on the damper depending upon the position of the damper in the duct outlet opening. For example, it has been found that the overhanging portions of the damper together with the marginal edges of the opening controlled by the damper form a slot which decreases in effective fluid flow area as the damper approaches a closed position. The suction at these respective slot areas tends to increase as the damper approaches a closed position until the damper approaches a near closed position whence the suction decreases quite rapidly.

The amount of suction can be increased at the slot area by extending the length of overhang of the damper with respect to the marginal edges of the duct outlet opening, however, this merely increases the length of the slot and does not eliminate the detrimental effects of the non-linear variation phenomenon.

According to the general principles of the present invention, the flutter action of the damper is effectively minimized by providing flexible contact members between the overhanging edge portions of the damper and the corresponding marginal portions of the duct outlet opening so that the flexible portions will be free to deflect under air pressure with the result that a damping action will reduce rapid changes in closure suction.

The principles of the present invention further contemplate the provision of a spoiler device on the damper to counteract the closure suction by producing a jet of fluid tending to prevent the high velocity flow of ventilating fluid over the surface portions of the damper, thereby minimizing the adverse effects of rapidly changing closure suction.

The jet produced by the spoiler device results in a reaction providing a force which tends to oppose the forces of closure suction.

It is an object of this invention, therefore, to provide a flutterless damper for a heat register structure.

Another object of present invention is to provide a damper having means to effectively counteract the flutter-producing action of closure suction operating on a damper which is adjustably moved between an open and closed position.

Yet another object of the present invention is to provide a damper which is rotatably moved between open and closed position and in which means are provided to control the closure torque exerted thereupon.

A further object of the present invention is to provide a shutter having damping means tending to minimize rapid changes in closure suction operating thereon as the shutter approaches a closed position.

Many other features, advantages and additional objects of the present invention will become manifest to those versed in the art upon making reference to the detailed description which follows and the accompanying sheets of drawings in which a preferred structural embodiment of a heat register structure incorporating the principles of the present invention is shown by way of illustrative example.

On the drawings:

Figure 1 is a fragmentary elevational view of a heat register structure incorporating the principles of the present invention;

Figure 2 is a cross-sectional view taken substantially on line II—II of Figure 1 showing in enlarged form additional details of construction of the register structure and showing the shutter or damper of the present invention in closed position;

Figure 3 is a view similar to Figure 2 but showing the shutter or damper in an open position;

Figure 4 is a front elevational view with parts removed and with parts broken away to show additional details of construction of the heat register structure provided in accordance with the principles of the present invention; and Figure 5 is a fragmentary rear elevational view with parts removed showing additional structural details of the heat register structure provided in accordance with the principles of the present invention.

As shown on the drawings:

The heat register structure provided in accordance with the principles of the present invention is shown generally at 10 and is adapted to be mounted on a wall 11 or other suitable supporting surface, at the end of a duct 12 carrying pressurized ventilating fluid supplied from a suitable temperature conditioning source (not shown), the heat register structure 10 comprising a frame 13 having an opening 14 arranged to provide an outlet for the duct 12.

The frame 13 of the heat register structure 10 is held in firm assembly with the wall by means of a plurality of suitable fasteners 16 and it will be understood that the wall 11 is also provided with a suitable aperture 17 which lies between the end of the duct 12 and the duct outlet 14 formed in the frame 13. A sponge rubber gasket 18 is preferably interposed between the wall and the frame 13 to insure flow of the temperature conditioned pressurized ventilating fluid through the duct outlet 14.

An air distributing member 19 is fastened to the frame 13 and forms together therewith a plurality of baffled air passages indicated at 20a and 20b which direct the air flowing outwardly through the duct outlet 14 generally adjacent the surface of the wall 11.

To control the flow of temperature conditioned pressurized ventilating fluid through the duct outlet 14, a damper or shutter 21 is provided.

The damper or shutter 21 comprises a butterfly-type vane and is suspended for angular displacement in the duct outlet 14 for adjustable angular positioning relative to the frame 13, thereby to control the flow of fluid through the duct outlet 14.

At one end of the damper or shutter 21 is connected a retainer 22 having projecting arm portions which are spaced apart from one another and which are arranged to be connected to the ends of a pair of return springs indicated at 23 and 24 respectively. The retainer 22 is also constructed to be connected to one end of each of a pair of suspension members indicated at 26 and 27, the other end of which is connected to a retainer 28 assembled to the frame 13 by means of a fastener 29.

It may be noted that the frame 13 is provided with a pair of bosses 30 and 31 which are suitably apertured to receive fastening screws 32 and 33 respectively serving to retain the opposite ends of the return springs 23 and 24.

At the opposite end of the damper or shutter 21, a tension wire 34 is attached by means of a tension wire clip 36 riveted to the damper or shutter 21 by means of a rivet 37. The other end of the tension wire 34 is connected to a disk 38 threaded into one end of a coil spring 39. The other end of the coil spring 39 is threaded around a support member 40 radially supported in a generally cylindrical housing 41 by means of a plurality of radially spaced legs 42 which engage the walls of the housing 41. The end of the housing 41 is closed by a plug 43 which threads into the support member 40. A thermostatic element of the type having linearly translatable elements movable in response to changes of temperature is carried by the plug 43 and the linear movements thereof are transmitted to the tension wires by a spacer 44 abutting the disk 38 and the thermostatic elements.

In order to selectively adjust the sensitivity of the thermostatic device, the plug 43 may be threadedly adjusted relative to the support member 40 to vary the tension of the coil spring 39.

It will be understood that the generally cylindrical housing 41 is firmly assembled to the frame 13 so that the damper or shutter 21 is tensilely suspended in the duct outlet 14 at a predetermined state of equilibrium depending upon the torsional stress imparted to the damper or shutter 21 by the twisted suspension members 26 and 27 and the return springs 23 and 24 as well as the tension member 34. As soon as the tension on the damper or shutter 21 changes, for example, if the linearly translatable thermal elements move the tension wire 34 against the tension of the coil spring 39, the damper or shutter 21 will seek a new position of equilibrium and hence will assume a different adjusted position in the duct outlet 14.

In order to make the thermal elements of the control apparatus responsive to variations in the temperature of the space being temperature conditioned, the generally cylindrical housing 41 is provided with aspirator features. For example, the part of the cylindrical housing 41 facing the duct is provided with an opening 46 which is of comparatively small size with respect to a larger opening substantially diametrically opposite the opening 46 and indicated at 47, which opening 47 is in full communication with the space being temperature conditioned. The flow of pressurized fluid from the duct 12 through the opening 46 and the opening 47 into the space being temperature conditioned induces a flow of air through the open end of the generally cylindrical housing 41 past the thermal elements so that the thermal elements may respond to variations in the temperature of the space being temperature conditioned.

In providing a butterfly type vane for use as a damper or shutter in controlling the flow of a pressurized temperature conditioned fluid through a duct outlet, the usual practice is to provide marginal edge portions on the damper or shutter which substantially overhang or overlap opposite faces of the margins surrounding the duct outlet. It will be understood that the overlapped portion or the overhanging portion of the damper or shutter together with the corresponding marginal portion of the duct outlet together form slot areas through which the fluid moving out of the duct has to travel. In studying the flow characteristics and the resulting physical reactions of a heat register incorporating a butterfly damper, it has been observed that a force of closure suction is produced on the damper or shutter tending to exert a torque of sufficient quantitative value on the damper or shutter to affect the angular positioning thereof. It has further been observed that the closure suction force tends to increase as the damper or shutter approaches a closed position until the size of the slot areas reaches a predetermined optimum whereupon the suction force rapidly decreases. Thus, as the vane moves towards closed position the increased suction force produces a translatory movement of the vane away from its ordinary equilibrium position as well as a rotational movement until the suction force rapidly decreases whereupon the vane will again tend to assume its ordinary equilibrium position. As a result, the positioning of the vane at a near closed position may result in an oscillation or flutter which not only produces an undesirable noise effect but also subjects the register structure to vibrational forces which are likely to deterioratively affect the structural components of the register.

In accordance with the general principles of the present invention, a strip of flexible material 48, preferably felt or the like is affixed to the frame 13 adjacent the duct outlet 14 at the upper portion thereof and is arranged to have a projecting portion 48a extend into the duct outlet 14.

A strip of flexible material 49 is attached to the damper or shutter 21 at the lower portion thereof and has a projecting portion 49a which overhangs or overlaps the margin provided by the frame 13 adjacent the bottom portion of the duct outlet 14.

In Figure 2, it will be noted that the flexible material 48 provides a cushion which tends to seat the upper margin of the damper or shutter 21 without shock so as to close that portion of the duct outlet 14. The flexible material 49 also engages the adjacent margin of the frame 13 without shock so as to close that portion of the duct outlet 14.

In Figure 3 showing the damper or shutter 21 positioned in an open adjustment, it will be noted that the projecting portion 48a of the flexible material 48 and the projecting portion 49a of the flexible material 49 is deflected away from the normal dotted line position to the full line position shown in the drawings by virtue of the pressurized flow of temperature conditioned ventilating fluid passing through the duct outlet 14 from the duct 12. It will be understood that the deformation of the projecting portions 48a and 49a tends to bring the damper or shutter 21 into a closed relationship more quickly than would be ordinarily the case if the overhang of the damper or shutter 21 were rigid. Thus, as the damper or shutter 21 approaches a closed position, the flexible members 48 and 49 operate to minimize rapid changes in closure suction and facilitate flutterless operation of the damper or shutter 21.

To further facilitate the elimination of damper or shutter flutter, the present invention contemplates the provision of a spoiler on the damper or shutter 21 comprising a baffle 50 offset from one edge of the damper or shutter 21. In this particular embodiment, the spoiler 50 comprises a bent over edge portion arranged at an acute angle with respect to the plane of the damper or shutter 21 and extending substantially the entire width of the damper or shutter 21. The spoiler 50 counteracts closure suction by producing a jet action tending to prevent the high velocity flow of pressurized ventilating fluid over the surface of the damper or shutter 21. In other words, the flow of fluid directed by the acutely inclined spoiler 50 is angularly offset to the planar surface prescribed by the surface of the damper or shutter 21.

The damper or shutter 21 is also provided with an offset margin 51, which offset margin 51 may be conveniently formed by bending the edge portion of the damper or shutter 21 inwardly in an opposite direction from the spoiler 50, thereby tending to provide an additional spoiling action which will minimize the adverse effects of closure suction. In other words, the edge portions being offset from the plane of the vane, the flow of fluid over said edge portion is also angularly offset and counteracts closure suction on the vane.

Although various minor modifications of structure might be suggested by those versed in the art, it will be understood that we wish to embody within the scope of the patent warranted hereon all such modifications as reasonably and properly come within the scope of our contribution to the art.

We claim as our invention:

1. In a register apparatus for controlling the flow of fluid from a ventilating duct, a frame, said frame having an opening providing an outlet for the duct, and a butterfly damper pivotally supported in said opening and having opposite edges thereof seated on opposite sides of said frame on opposite margins of said opening when in closed position, said frame having a flexible member connected thereto extending inwardly of one of said margins of said opening to engage said damper, said flexible member being deflectable out of the plane of said opening in response to the pressure flow of fluid through said outlet to engage said damper before it is fully closed, thereby to damp said damper and to reduce rapid changes in closure suction.

2. A register apparatus comprising a frame having an opening forming a flow outlet, a butterfly damper in said opening to control the flow of fluid therethrough, said damper having a re-entrant lip inclined at an acute angle relative to the downstream surface of the damper and formed on that edge of the damper which extends upstream relative to the pivotal axis of the damper to substantially balance out the closure torque on said damper.

3. In an air flow controller, a housing defining an air passage, a rotatable shutter in control of the air flow through said passage, suspension members extending between the shutter and the housing and being twisted so as to torsionally load the shutter, tensioning means connected to the suspension members for controlling rotation of the shutter by variably tensioning the suspension members to change the torsional load on the shutter, said housing having one marginal portion adjacent the flow passage made of flexible material extending inwardly of the marginal edge of the damper frame to engage that portion of the shutter which seats against the air flow through the flow passage, said flexible margin being deflectable in a downstream direction in response to the pressure flow through said passage, thereby to damp said shutter and to minimize rapid changes in closure suction on said shutter when approaching a closed position.

4. In a register apparatus for controlling the outward flow of fluid from a ventilating duct, a frame adapted to close the end of the ventilating duct, said frame having an opening providing an outlet for the duct, a butterfly damper pivotally supported in said opening and having opposite edges thereof seated on opposite sides of said frame on opposite margins of said opening when in closed position, and an outwardly projecting offset margin formed on the bottom edge of said damper to counteract closure suction comprising a baffle surface offset on the outside of the damper and inclined at an acute angle relative to the downstream surface of the damper to direct the flow of air away from the lower outside face of the damper and to prevent the high velocity flow of pressure fluid over the lower outside surface of the damper when in open position.

5. In a register apparatus for controlling the flow of fluid, a frame, said frame having an opening providing a flow outlet, and a butterfly damper pivotally supported in said opening and having opposite edges thereof seated on opposite sides of said frame on opposite margins of said opening when in closed position, said frame having one of said margins of said opening flexible to engage said damper, said flexible margin of said frame being deflectable in response to the pressure flow of fluid through said outlet to engage said damper before said damper is fully closed, thereby to damp said damper and to reduce rapid changes in closure suction, said damper having a flexible edge portion engaging the opposite one of said margins to engage to said frame, said flexible edge portion of said damper being deflectable in downstream direction in response to the pressure flow of fluid through said outlet and into engagement with said frame before said damper is fully closed to further dampen said damper and to further reduce rapid changes in closure suction.

References Cited in the file of this patent

UNITED STATES PATENTS

| Number | Name | Date |
|---|---|---|
| 1,248,926 | Schantz | Dec. 4, 1917 |
| 1,997,833 | Roland | Apr. 16, 1935 |
| 2,009,740 | Mader | July 30, 1935 |
| 2,046,215 | Stacey et al. | June 30, 1936 |
| 2,086,076 | Goerg | July 6, 1937 |
| 2,095,263 | Moss | Oct. 12, 1937 |
| 2,157,025 | Snediker | May 2, 1939 |
| 2,207,147 | Gilbertson | July 9, 1940 |
| 2,331,758 | Barnett | Oct. 12, 1943 |
| 2,354,155 | Sternberg | July 18, 1944 |
| 2,523,497 | Copping | Sept. 26, 1950 |
| 2,586,927 | Fantz | Feb. 26, 1952 |
| 2,586,997 | Schach | Feb. 26, 1952 |
| 2,593,133 | Geary | Apr. 15, 1952 |
| 2,612,829 | Joyce | Oct. 7, 1952 |